(12) United States Patent
Banks et al.

(10) Patent No.: US 8,762,892 B2
(45) Date of Patent: Jun. 24, 2014

(54) CONTROLLING AN INTEGRATED MESSAGING SYSTEM USING GESTURES

(75) Inventors: Richard M. Banks, Cambridge (GB); Philip Gosset, Stroud (GB); Richard Harper, Cambridge (GB); Abigail Sellen, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 874 days.

(21) Appl. No.: 12/022,864

(22) Filed: Jan. 30, 2008

(65) Prior Publication Data

US 2009/0193348 A1    Jul. 30, 2009

(51) Int. Cl.
    *G06F 3/0488*    (2013.01)
(52) U.S. Cl.
    USPC .......................................... 715/863; 715/864
(58) Field of Classification Search
    USPC .......................... 715/764, 863, 864
    See application file for complete search history.

(56) References Cited

U.S. PATENT DOCUMENTS

| | | | |
|---|---|---|---|
| 5,790,121 A * | 8/1998 | Sklar et al. ..................... 715/853 |
| 6,215,498 B1 * | 4/2001 | Filo et al. ..................... 345/419 |
| 6,222,465 B1 | 4/2001 | Kumar et al. |
| 6,310,610 B1 | 10/2001 | Beaton et al. |
| 6,340,979 B1 | 1/2002 | Beaton et al. |
| 6,529,900 B1 * | 3/2003 | Patterson et al. ..................... 1/1 |
| 7,039,676 B1 * | 5/2006 | Day et al. ..................... 709/204 |
| 7,233,316 B2 * | 6/2007 | Smith et al. ..................... 345/157 |
| 7,542,845 B2 * | 6/2009 | Sands et al. ..................... 701/457 |
| 8,302,030 B2 * | 10/2012 | Soroca et al. ..................... 715/810 |
| 8,543,937 B2 * | 9/2013 | Nielsen et al. ..................... 715/781 |
| 8,615,719 B2 * | 12/2013 | Ramer et al. ..................... 715/810 |
| 2002/0045960 A1 * | 4/2002 | Phillips et al. ..................... 700/94 |
| 2002/0067376 A1 * | 6/2002 | Martin et al. ..................... 345/810 |
| 2003/0210286 A1 * | 11/2003 | Gerpheide et al. ............ 345/863 |
| 2005/0052427 A1 | 3/2005 | Wu et al. |
| 2006/0026521 A1 * | 2/2006 | Hotelling et al. ............. 715/702 |
| 2006/0026536 A1 | 2/2006 | Hotelling et al. |
| 2006/0173911 A1 * | 8/2006 | Levin et al. ................. 707/104.1 |
| 2006/0242554 A1 * | 10/2006 | Gerace et al. ............. 715/501.1 |
| 2007/0013670 A1 | 1/2007 | Chien et al. |
| 2007/0046643 A1 | 3/2007 | Hillis et al. |
| 2007/0124694 A1 | 5/2007 | Van De Sluis et al. |
| 2007/0247422 A1 | 10/2007 | Vertegaal et al. |
| 2008/0168402 A1 * | 7/2008 | Blumenberg ................. 715/863 |

(Continued)

FOREIGN PATENT DOCUMENTS

WO    WO2007133483 A1    11/2007

OTHER PUBLICATIONS

"SMART Board Software Version 8.1.3 Introduces Touch Gestures", SMART Technologies Inc., Aug. 10, 2004, pp. 1-3.

(Continued)

*Primary Examiner* — Phenuel Salomon
(74) *Attorney, Agent, or Firm* — Pablo Tapia; Jim Ross

(57) ABSTRACT

Methods and apparatus for displaying and interacting with messages are described. Messages are displayed using one of a number of different visualization schemes provided. A user can interact with messages or change the selected visualization scheme using gestures and the mapping of gestures to particular actions is different for different visualization schemes. In an embodiment the messages are received via integrated messaging channels and messages are classified using a number of properties. Each of the visualization schemes has a different way of graphically representing messages and each scheme is adapted to emphasize a different combination of message properties.

20 Claims, 8 Drawing Sheets

(56) References Cited

U.S. PATENT DOCUMENTS

| | | | |
|---|---|---|---|
| 2009/0144642 A1* | 6/2009 | Crystal | 715/764 |
| 2009/0158203 A1* | 6/2009 | Kerr et al. | 715/784 |
| 2009/0164937 A1* | 6/2009 | Alviar et al. | 715/800 |
| 2010/0207874 A1* | 8/2010 | Yuxin et al. | 345/156 |

OTHER PUBLICATIONS

Wong, "Touch-Screen Phones Poised for Growth", at <<http://www.usatoday.com/tech/products/2007-06-21-1895245927_x.htm>>, 2007, pp. 1-3.

* cited by examiner

CONTROLLING AN INTEGRATED MESSAGING SYSTEM USING GESTURES

BACKGROUND

Integrated messaging systems enable different types of messages (e.g. voice messages and email messages) to be viewed through a single graphical user interface (GUI). This graphical user interface generally displays items in chronological order (e.g. by time of delivery of the message) although the messages can be sorted according to other parameters, such as the sender or the subject of the message. Interaction with the integrated messaging systems is through the standard WIMP (windows, icons, menus and pointer) interface of a computer. In some environments, however, such as mobile communications or home settings, the WIMP interface is either not appropriate or not available.

The embodiments described below are not limited to implementations which solve any or all of the disadvantages of known integrated messaging systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and apparatus for displaying and interacting with messages are described. Messages are displayed using one of a number of different visualization schemes provided. A user can interact with messages or change the selected visualization scheme using gestures and the mapping of gestures to particular actions is different for different visualization schemes. In an embodiment the messages are received via integrated messaging channels and messages are classified using a number of properties. Each of the visualization schemes has a different way of graphically representing messages and each scheme is adapted to emphasize a different combination of message properties.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, in some environments, a WIMP interface may not be an appropriate method of interacting with an integrated messaging system or a WIMP interface may not be available. For example, in a home setting (e.g. in a kitchen) it may not be desirable to use a keyboard and the use of a large touch sensitive screen and gesture interaction may be more appropriate. For mobile applications, a smaller touch sensitive screen and gesture interaction may be used. A user may wish to be able to view their messages at a glance and interact with them in a simple intuitive manner.

Figure 1:
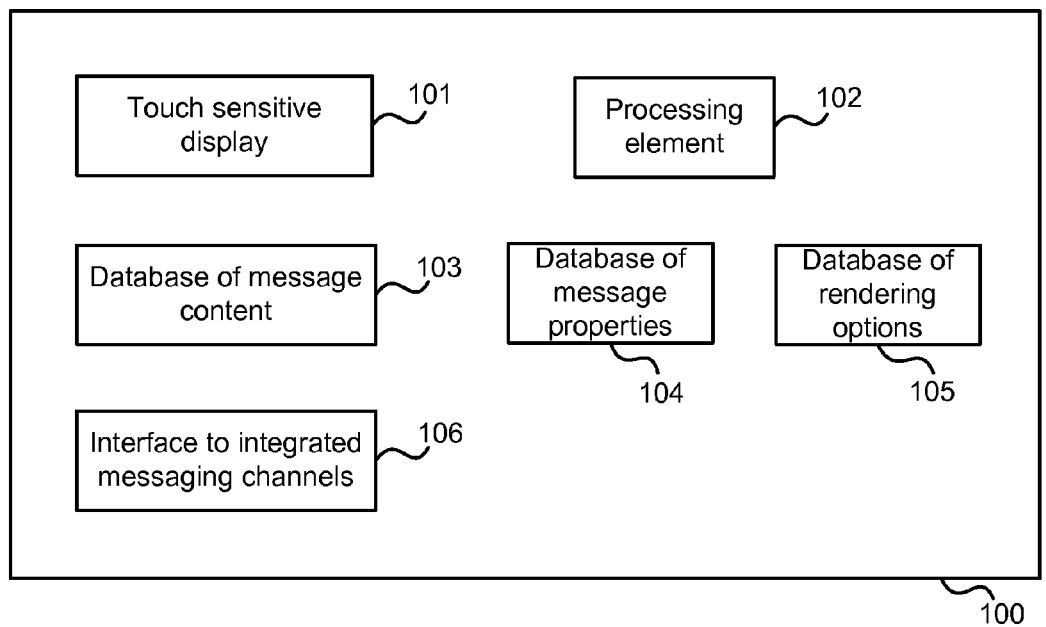
FIG. 1 is a schematic diagram of an integrated messaging display system.

FIG. 1 is a schematic diagram of an integrated messaging display system 100 which displays the messages using one of a set of visualization schemes which may be selected by the user. The integrated messaging display system 100 comprises a touch sensitive display 101, a processing element 102, databases of message content 103, message properties 104 and rendering options 105, and an interface to integrated messaging channels 106. The user may interact with the integrated messaging display system through gestures and dependent upon the visualization scheme selected, different gestures may be mapped to different actions which are performed by the integrated messaging display system. These actions may relate to the way that the messages are displayed by the system. Some gestures may be mapped to the same actions across all visualization schemes e.g. actions which control which one of the set of visualization schemes is used. The visualization schemes within the available set of visualization schemes each emphasize different aspects of the messages (as described in more detail below) although the set may include more than one visualization scheme which emphasizes the same aspects of the messages.

The touch sensitive display 101 may comprise any display which enables detection of finger or hand gestures and may use any suitable technology, including but not limited to, capacitive, resistive and optical sensing technologies. The touch sensitive display 101 may itself be capable of detecting gestures or the detection may be performed by the combination of the touch sensitive display 101 and the processing element 102. In some embodiments, the gestures used to interact with the integrated message display may be limited to tap, multiple tap, touch and linger (ranges of interaction with an object defined by time) and drag (the movement of an object). In other embodiments, other gestures may be used in addition to, or instead of, any of those listed. In detecting a gesture, the location of the gesture (i.e. its position in relation to any objects or icons displayed on the touch sensitive display) and its nature (e.g. tap, multiple tap, touch, multiple touch and linger or drag) are both identified. The gestures therefore provide more than pointer replacement (which would just require location information). The gestures may be finger gestures. In other examples a user's hand or an object may be used to gesture on the touch sensitive display.

The databases 103-105 may comprise three separate databases or one or more of the databases may be combined. In an example, the database of message properties 104 and the database of message content may be combined in a database containing both the properties and the content.

The database of message content 103 is used to store the actual content of the messages received, which may include text, images, videos, sound files etc. The database of message properties 104 is used to store properties associated with each of the messages received (and stored in the database of message content 103). These properties enable the taxonomical classification of the messages received and may, for example, include the internal and external properties of messages. Internal properties of a message relate to the content of the message itself, such as whether it comprises SMS (short message service) text, email, MMS (multimedia message service), sound, video, data, a url etc. External properties of a message relate to the transmission of the message, such as a unique message ID, the sender (or originator) ID, the time the message was sent, the recipient ID, the time of arrival (also referred to as the time of delivery), the state of the message (e.g. unread, read, replied to etc) and any priority rating. Other example properties include a privacy labeling of a message or its content, the channel by which the message was sent and the channel by which the message was received (which may be different, e.g. where a voicemail message is converted to an email message), a machine name (e.g. which machine does the message belong to or is displayed on), etc.

Figure 2:
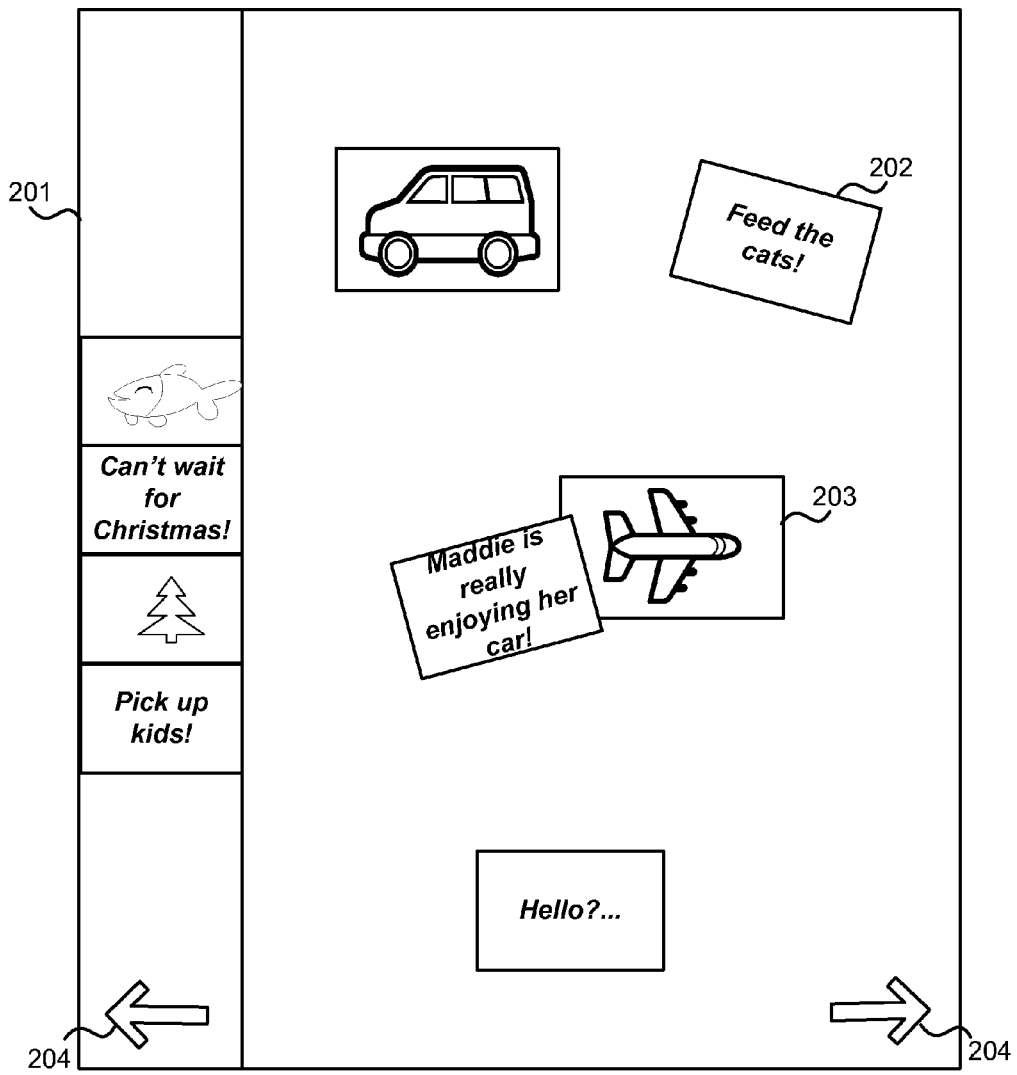
FIGS. 2-4 show three different examples of visualization schemes.
Figure 3:
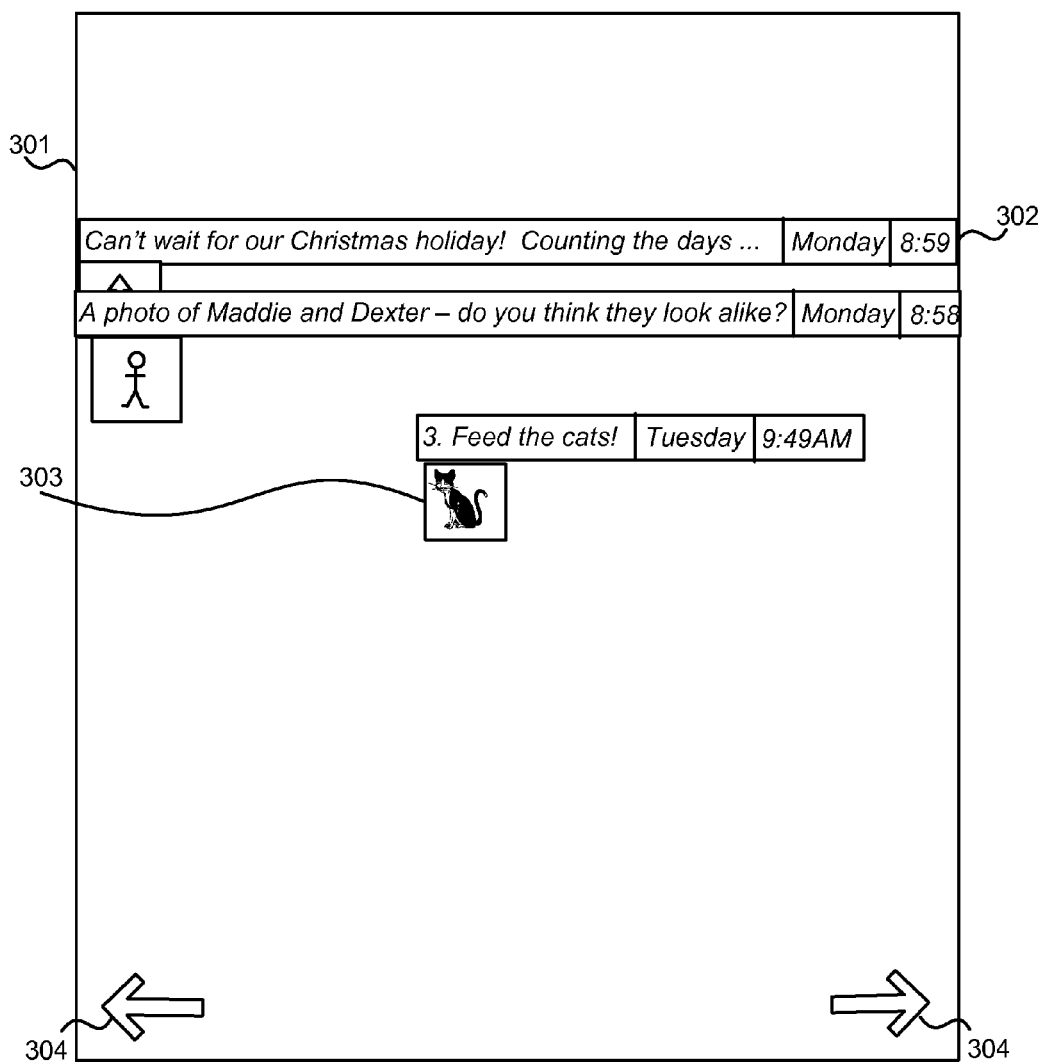
Figure 4:
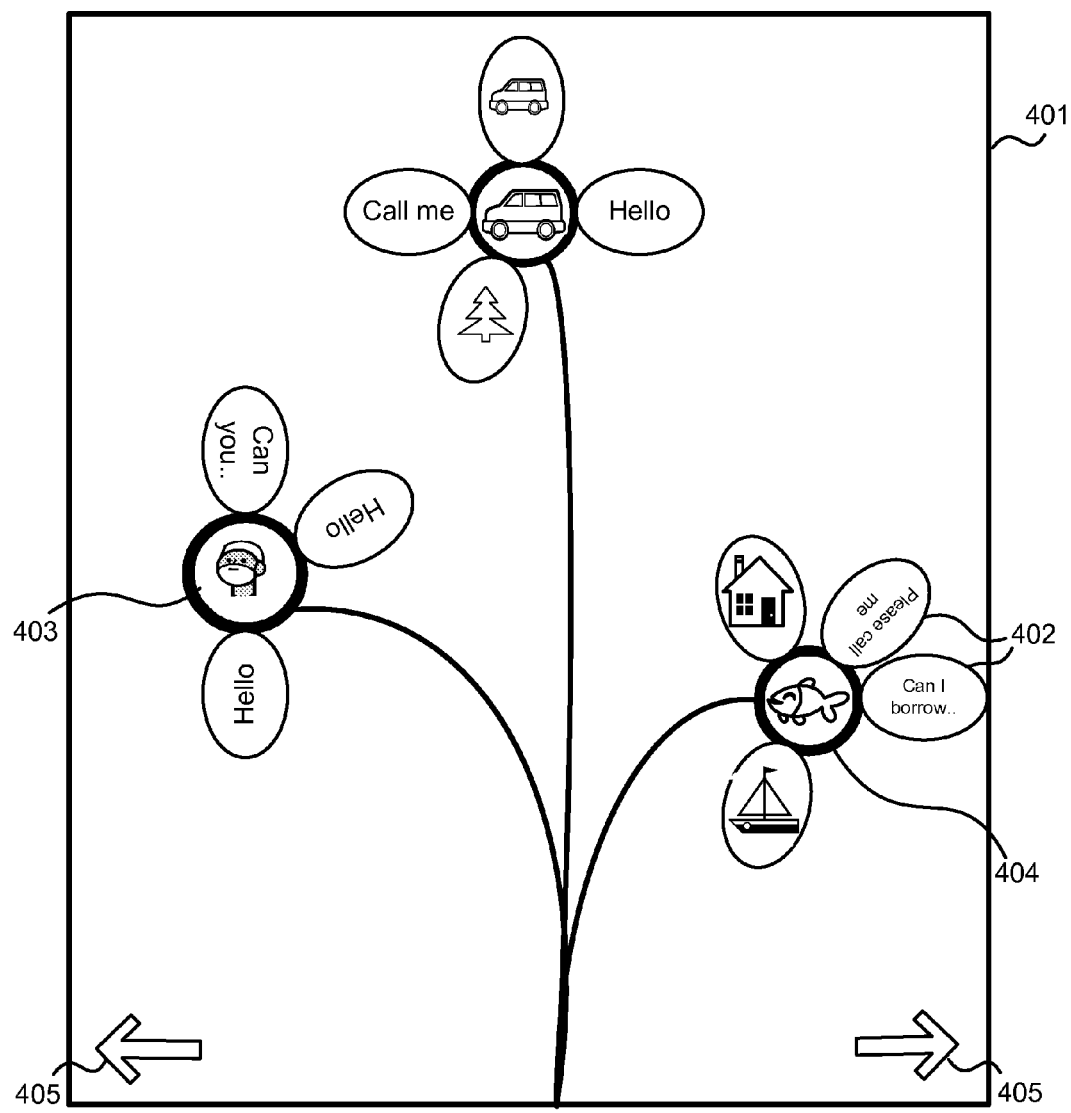

The database of rendering options 105 is used to store information relating to each of the rendering options (also referred to as visualization schemes) provided by the system. Each visualization scheme emphasizes a different message property or combination of message properties, as shown in FIGS. 2-4 which show three different examples of visualization schemes 201, 301, 401. The different visualization schemes provided by the system may therefore provide different information or represent the messages in different ways, rather than using a single visualization scheme and simply enabling a user to change the order in which the data is displayed (as occurs in known messaging systems).

The first example visualization scheme 201 emphasizes the image and/or text that a message contains and renders objects 202 for each message as close as possible to being isomorphic (i.e. with the same structure) and where each object displays the message content itself, (scaled to the size of the object or screen), rather than a representation of the content. In this example, messages which contain both images and text are displayed like postcards, with either the text (see object 202) or the image (see object 203) visible at any one time and with the user being able to flip between the two using gesture based interaction (as described in more detail below). The second example 301 emphasizes the time of arrival and the text content of messages, with text boxes 302, which contain both the text content and the time of arrival, being displayed for each message in chronological order. Where a message also includes an image, these are also displayed 303. The third example 401 emphasizes sender ID, with messages from the same sender being rendered as petals 402 on the same flower. In this visualization scheme, an image of the sender 403 or an icon associated with the sender ID 404 may be displayed at the centre of each flower. Where messages for multiple recipients are displayed using the same system, another example visualization scheme may be provided which is similar to that shown in FIG. 4, but with flowers associated with each of the recipient IDs.

It will be appreciated that whilst FIGS. 2-4 show three different example visualization schemes, these are provided by way of example only and many different visualization schemes which emphasize the same or different combinations of properties may be used. Furthermore systems may provide any number of visualization schemes from which the user may select one visualization scheme for use at any one time. In an example, only a single visualization scheme may be provided.

The system may provide an interface to enable a user to specify or tailor a visualization scheme. For example, a user may be able to select the message properties which are to be emphasized by a visualization scheme and may also be able to select the manner in which messages are graphically depicted. In another example, the user may be able to select the message properties to be emphasized and then the system may automatically design and generate a new visualization scheme. Where a system is used by multiple users, different visualization sets may be provided for different users.

In addition to storing the information required for rendering each visualization scheme (e.g. the graphical user interface (GUI) information), the database of rendering options 105 also stores mapping data for each visualization scheme which defines the mapping between detected gestures and actions. These actions may control the visualization scheme itself or may result a change in visualization scheme which is displayed (or initially the selection of a visualization scheme for use). Where the actions control the visualization scheme itself, the actions may correspond to different interactions between a user and a message (or the corresponding message object displayed), such as reading, viewing, moving and deleting. Different mapping data is provided for each visualization scheme although some gestures may be mapped to the same action, irrespective of the visualization scheme which is currently being used (i.e. currently active). For example, lingering over one of the arrows 204, 304, 405 in any of the visualization schemes may result in a change of the visualization scheme that is used. These common mappings between visualization schemes may be repeated in the mapping data for each visualization scheme or may be stored in central mapping data used for all visualization schemes. In some examples, the mapping data may be stored separately from the information required for the rendering of each visualization scheme (e.g. there may be two databases, a database of rendering information and a database of mapping information).

The interface to integrated messaging channels 106 enables the system to receive multiple different types of messages, such as voice messages, SMS messages, MMS messages, video messages, emails, facsimiles etc. The interface may also be used to send messages, as described below. The interface may connect to an integrated messaging system. Such a system treats all messages, irrespective of the message type, in the same way. In other examples, the interface may connect to multiple systems for different types of messaging.

The messages received, via the interface 106, will be tagged with one or more message properties. Different communications standards specify which properties must be delivered with messages and as new communications standards are developed which specify additional properties, these can be included within the database of message properties 104 and used in generating new visualizations. In some examples, messages may be parsed to determine additional properties and this parsing may be performed by the processing element 102, within the integrated messaging channels or elsewhere.

Figure 5:
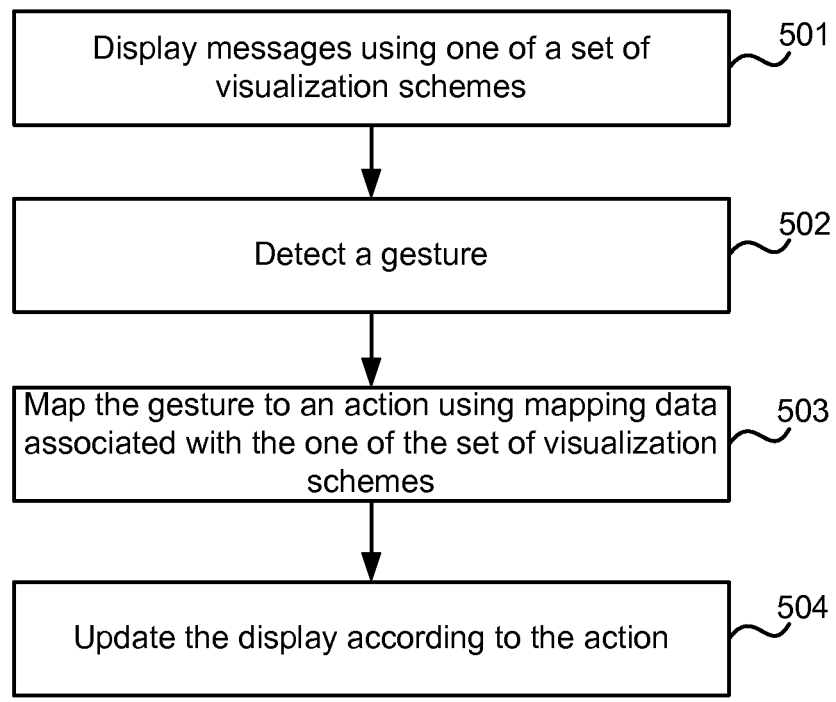
FIG. 5 shows a flow diagram of an example method of operation of the system shown in FIG. 1.

FIG. 5 shows a flow diagram of an example method of operation of the system shown in FIG. 1. The system displays messages received via integrated messaging channels using one of a set of visualization schemes (block 501). On detection of a finger gesture (block 502), mapping data from the database of rendering options 105 is used to map the gesture to an action (block 503). The mapping data used is selected according to the particular visualization scheme in use. The action to which the gesture is mapped may be an interaction with a message which is displayed or an interaction with the visualization scheme itself, e.g. to change the visualization scheme which is currently in use. Having mapped the gesture to an action (in block 503), the GUI which is displayed on the touch sensitive display 101 is updated according to the action (block 504).

In the example visualization scheme shown in FIG. 2, interaction with message objects may be through drag and tap gestures, with the drag gesture being mapped to a drag action to move the position of a message object on the display and the tap gesture (on a message object) being mapped to an action which switches between displaying the image and the text in a message (analogous to turning over a postcard). Other gestures may be defined to delete a message (e.g. multiple tap) or save a message (e.g. by lingering a finger over the message object). The mapping for this visualization scheme is shown in the table below:

|  | Single touch | Multiple touch | Single tap | Multiple tap | Short linger | Long linger | Drag |
| --- | --- | --- | --- | --- | --- | --- | --- |
| Move object |  |  |  |  |  |  | X |
| Switch between image and text of a message |  |  | X |  |  |  |  |
| Delete |  |  |  | X |  |  |  |
| Save |  |  |  |  |  | X |  |

In the example visualization scheme shown in FIG. 3, a tap gesture on a message object may be mapped to an action which moves the particular message object to the top of the display and displays a larger version of any image in the message. In the example visualization scheme shown in FIG. 4, a tap gesture on a particular petal (which is a message object in this visualization scheme) may correspond to a 'read' action, such that the message in full is displayed. The message may be displayed in a window on top of the existing visualization scheme or the message may be displayed full screen.

Figure 6:
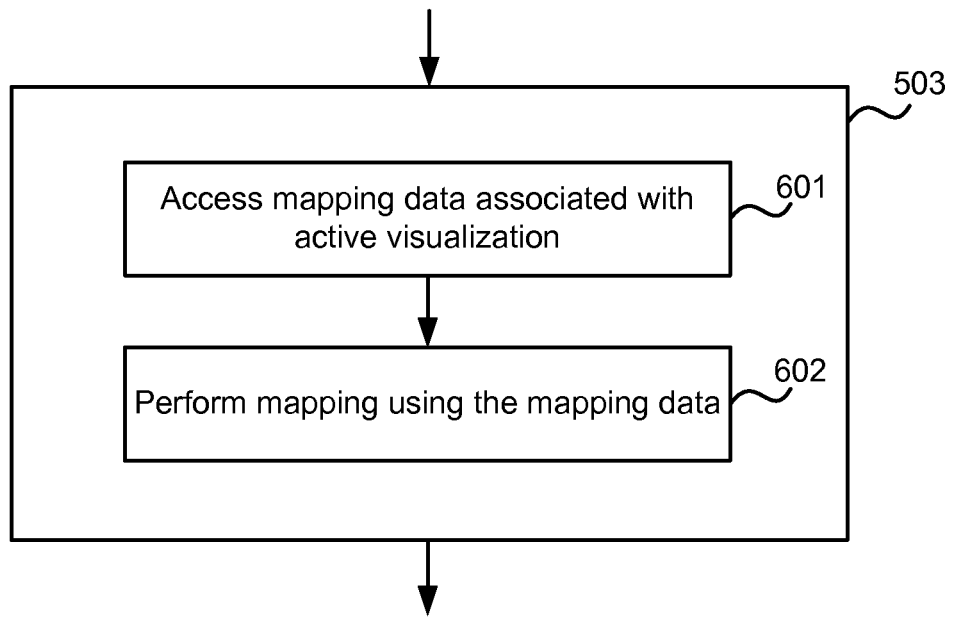
FIG. 6 shows one of the steps of FIG. 5 in more detail.

Initially a default visualization scheme may be used (in block 501) or a user may be provided with visualization scheme options on start-up of the system and the visualization scheme selected by the user may be used. The detection of the gesture (block 502) may be performed by the touch sensitive display 101 or the detection may be performed by the touch sensitive display 101 and the processing element 102. The mapping (block 503) may be performed by the processing element 102 which access the mapping data for the appropriate visualization scheme from the database of rendering options 105 (block 601 of FIG. 6) and then uses this mapping data to perform the mapping (block 602). The updating of the GUI (in block 504) may be performed by the processing element 102 which then outputs new data to be displayed on the touch sensitive display 101.

In addition to the different visualization schemes, different themes or skins may be available for the integrated messaging display system. The themes or skins may change the appearance of all of the set of available visualization schemes in a related manner, for example by changing the color scheme, style, font, etc associated with each of the visualization schemes.

In addition to using gestures to change the visualization used and to interact with a message object, a user may, in some embodiments, be able to use gestures to reply to messages. For example, a particular gesture (e.g. double tap) may be used to reply to a message. An onscreen keyboard may then appear to enable text entry and/or a microphone may be used to enable recording of a voice message. Where the system includes a camera, video messages may be recorded and sent in reply to messages.

Some embodiments may also enable sending of new messages (i.e. messages which are not in response to a message which has been received). This may be achieved by interacting with a 'New Message' object (rather than a message object associated with a received message), e.g. by double tapping on the 'New Message' object. As with replying, an onscreen keyboard, microphone and/or camera may be used to create the new message.

Having generated a message using the integrated messaging display system either in reply to a message or as a new message, the message may be sent using the interface to the integrated messaging channels 106.

Figure 7:
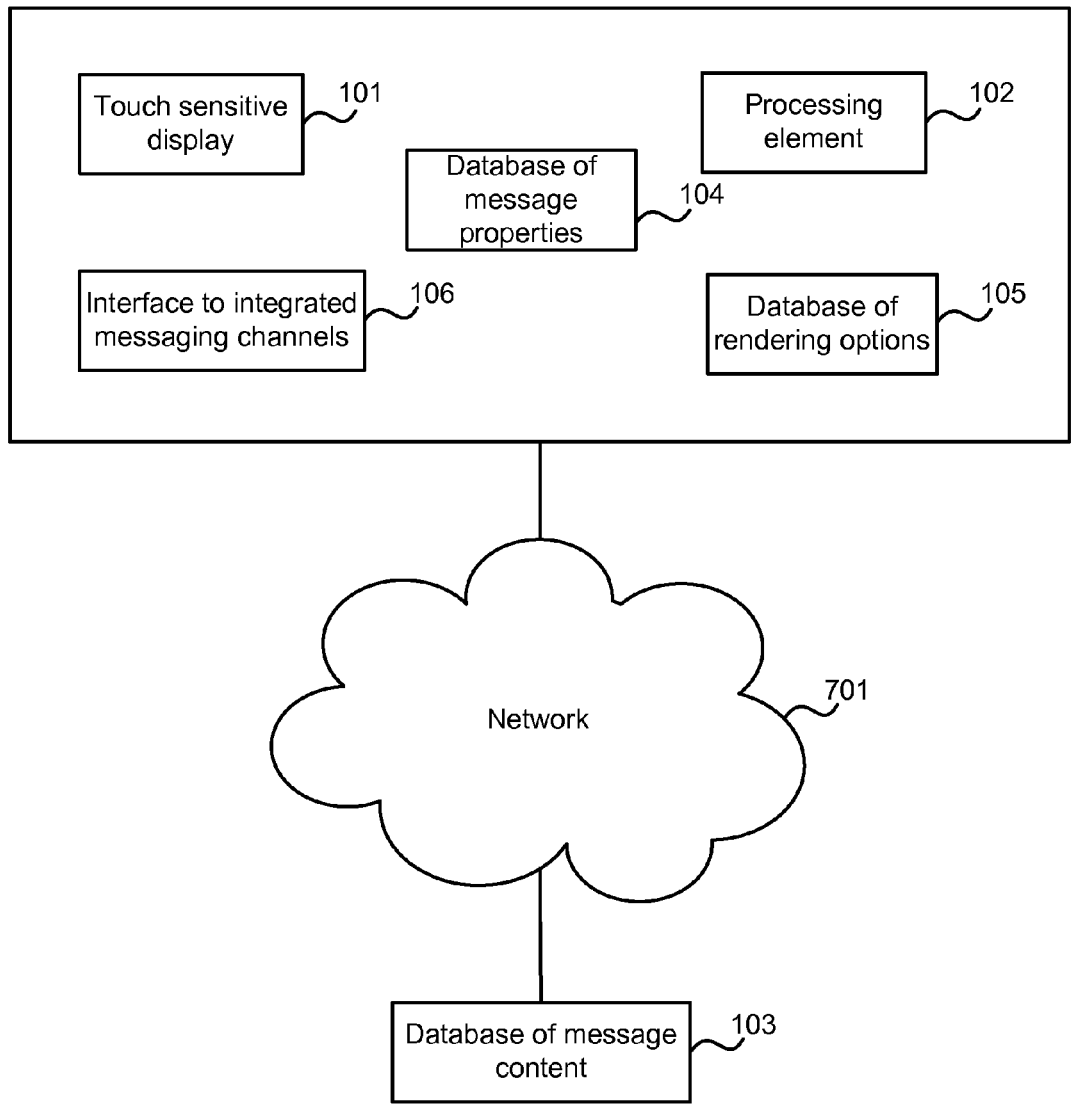
FIG. 7 is a schematic diagram of another integrated messaging display system.

The system shown in FIG. 1 may be implemented as a single device (comprising elements 101-106) or may be implemented in a distributed manner, as shown in FIG. 7. For example, the database of message content 103 may be stored remotely, e.g. on a server associated with an integrated messaging service or distributed across several servers associated with each of the different message types. The database of message properties 104 may, in some examples, be stored remotely and this may be co-located with the database of message content 103 (again in a single place or distributed) or may be located elsewhere. Where any of the databases 103-105 are located remotely, communication with the database may be over a network 701 (e.g. the internet, an intranet, a LAN, a cellular network etc).

Figure 8:
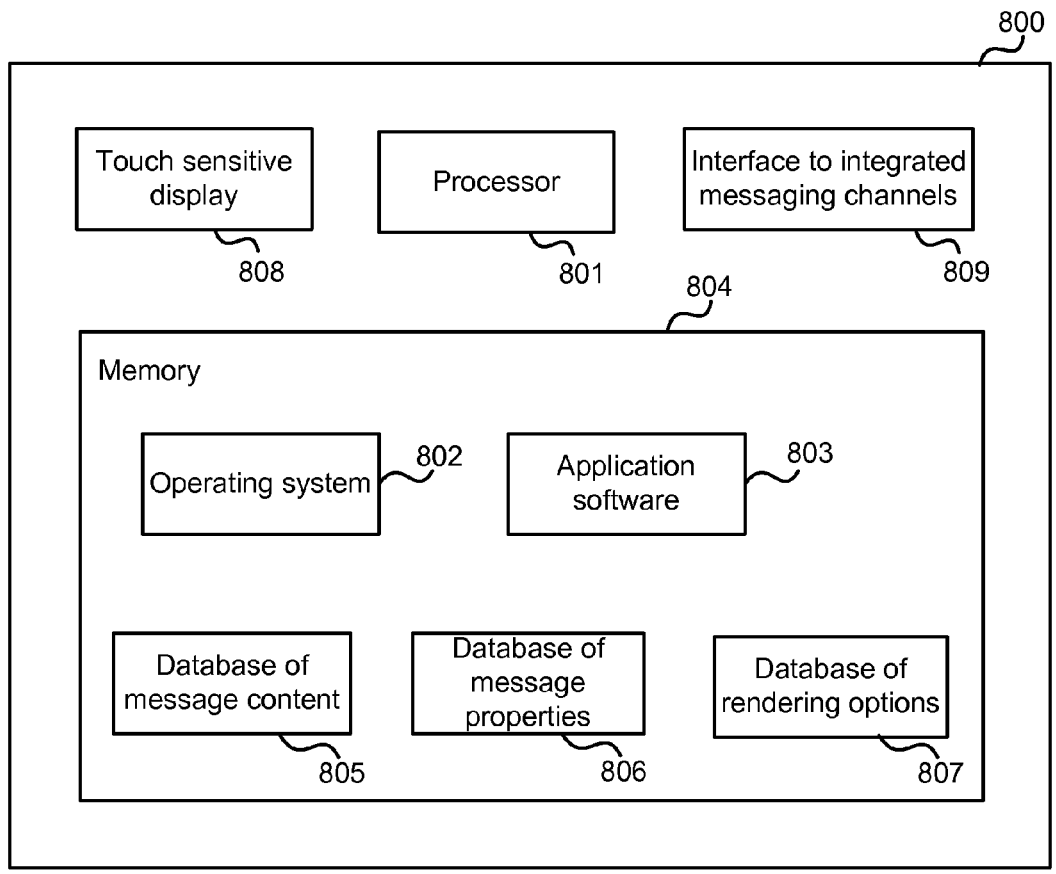
FIG. 8 illustrates an exemplary computing-based device in which embodiments of the methods described herein may be implemented.

FIG. 8 illustrates various components of an exemplary computing-based device 800 which may be implemented as any form of a computing and/or electronic device, and in which embodiments of the methods described herein may be implemented.

Computing-based device 800 comprises one or more processors 801 which may be microprocessors, controllers or any other suitable type of processors for processing computing executable instructions to control the operation of the device in order to provide the integrated messaging display system as described herein. Platform software comprising an operating system 802 or any other suitable platform software may be provided at the computing-based device to enable application software 803 to be executed on the device.

The computer executable instructions may be provided using any computer-readable media, such as memory 804. The memory is of any suitable type such as random access memory (RAM), a disk storage device of any type such as a magnetic or optical storage device, a hard disk drive, or a CD, DVD or other disc drive. Flash memory, EPROM or EEPROM may also be used. The memory may also be arranged to store the databases of message content 805, message properties 806 and rendering options 807.

The device 800 also comprises a touch sensitive display 808 and an interface to integrated messaging channels 809. The device may also comprise one or more inputs (not shown) which are of any suitable type for receiving media content, Internet Protocol (IP) input, etc, a communication interface (e.g. for connecting to a network, such as network 701 in FIG. 7), and one or more outputs such as an audio and/or video output.

In an example, the system may be provided as a stand-alone device which may, for example, be wall mounted. This stand-alone device comprises the touch sensitive display 101 and processing element 102. The device may also comprise one or more of the databases 103-105. In an example, the device comprises the database of rendering options 105 and the database of message properties, with the database of message content 106 being provided remotely (e.g. as shown in FIG. 7).

In another example, the software may be provided for a user to run on an existing computer system which comprises a touch sensitive display, an interface to integrated messaging channels, a processor and memory, in order that the computer system can operate as an integrated messaging display system as described herein.

The systems and methods described above provide a display system for messages received which is suitable for use in any environment and in particular in environments where WIMP interfaces are not available or appropriate. This may include the home environment (e.g. in the kitchen), hospital environments (where a WIMP interface may provide an infection risk), harsh environments (where WIMP interfaces may be impractical), mobile environments (e.g. on mobile phones, tablet PCs, PDAs) etc. Another example is a multi-user environment (such as in a school, business or emergency situation) where each user's time using the system is limited and therefore lightweight interactions through finger gestures may be appropriate. A further example is where messages need to be triaged by a number of different criteria, each of which can be shown in a different visualization, e.g. in the control center of the ambulance service or other emergency service where messages (which may be incoming telephone calls) can be triaged by priority and/or by the location of the sender.

Although the present examples are described and illustrated herein as being implemented in a touch sensitive screen based system, the system described is provided as an example and not a limitation. As those skilled in the art will appreciate, the present examples are suitable for application in a variety of different types of systems which are capable of gesture recognition. Other systems may, for example, use cameras to detect gestures.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
   selecting a visualization scheme on a user device from a set of visualization schemes that are different from each other, each visualization scheme being designed to emphasize a subset of message properties, the message properties comprising properties relating to content of a message and properties related to transmission of the message;
   displaying, on a touch screen of the user device, messages addressed to a user, that are received by the user device, based upon the selected visualization scheme, a first visualization scheme of the set of visualization schemes causing a first of the messages to be displayed with emphasis on a first property of the first of the messages and a second visualization scheme of the set of visualization schemes causing the first of the messages to be displayed with emphasis on a second property of the first of the messages, the first property of the first of the messages and the second property of the first of the messages being different, wherein in the first visualization scheme,
a first message comprises first text data and a first image, and
the first message is displayed in a first region in either a first representation or a second representation, the first representation displaying the first text data and not the first image, the second representation displaying the first image and not the first text data;
detecting a gesture by the user on the touch screen of the user device; and
mapping the gesture to an action that is to be performed by the user device, wherein the mapping of the gesture is dependent upon the selected visualization scheme and wherein the action comprises an interaction by the user device with one of the messages.

2. A method according to claim 1, wherein the messages comprise messages received via integrated messaging channels.

3. A method according to claim 1, further comprising: updating the display according to the action.

4. A method according to claim 1, wherein mapping the gesture to an action comprises:
accessing mapping data associated with the selected visualization scheme; and
mapping the gesture to an action using the mapping data.

5. A method according to claim 1, wherein detecting a gesture by a user comprises:
detecting a gesture from a set of gestures comprising: tap, multiple tap, touch and linger, and drag.

6. A method according to claim 1, wherein the set of visualization schemes that are available for selection by a first user are different from a second set of visualization schemes that are available for selection by at least a second user.

7. A method according to claim 1, wherein the action is replying to a selected message.

8. A method according to claim 7, wherein replying to the selected message includes enabling at least one of textual input, audio input, or video input.

9. A method according to claim 1, wherein one or more themes are applicable to the set of visualization schemes, application of one of the one or more themes to the set of visualization schemes changing the appearance of the visualization schemes in a related manner.

10. A messaging system comprising:
an interface to messaging channels;
a touch sensitive display arranged to display messages received via the interface using a selected one of a set of visualization schemes, each of the set of visualization schemes being designed to emphasize a subset of message properties, the message properties comprising properties relating to content of a message and properties related to transmission of the message, the messages comprising a plurality of properties that include two or more of the following: a recipient identifier, a sender identifier, an image, a message subject, or message content, a first visualization scheme of the set of visualization schemes causing a first of the messages to be displayed with emphasis on a first property of the first of the messages and a second visualization scheme of the set of visualization schemes causing the first of the messages to be displayed with emphasis on a second property of the first of the messages, the first property of the first of the messages and the second property of the first of the messages being different, wherein in the first visualization scheme,
a first message comprises first text data and a first image, and
the first message is displayed in a first region in either a first representation or a second representation, the first representation displaying the first text data and not the first image, the second representation displaying the first image and not the first text data; and
a processing element arranged to enable a user to interact with messages displayed using a gesture on the touch sensitive display and wherein the gesture is mapped to an interaction according to the selected visualization scheme, each visualization scheme organizes a different subset of the properties associated with the messages for display by the messaging system, a first gesture mapping in the first visualization scheme to switching between the first representation and the second representation.

11. A messaging system according to claim 10, further comprising:
a database of message properties comprising properties for messages received via the interface.

12. A messaging system according to claim 11, further comprising:
a database of messages comprising messages received via the interface.

13. A messaging system according to claim 10, wherein the processing element is arranged, on detection of a user gesture, to:
access mapping data for the selected visualization scheme; and
map the gesture to an action using the mapping data,
wherein the action comprises one of a user interaction with a message and selection of a visualization scheme.

14. A messaging system according to claim 13, further comprising:
a database of rendering options comprising the mapping data for each of the set of visualization schemes.

15. A messaging system according to claim 14, wherein the database of rendering options further comprises display data for each of the set of visualization schemes.

16. A messaging system of claim 10, wherein the gesture and the interaction are a combination being assigned to the selected visualization scheme and another combination of the gesture and another interaction are assigned to another visualization scheme.

17. One or more storage devices with device-executable instructions for performing steps comprising:
selecting a visualization scheme on a user device from a set of visualization schemes that are different from each other, each visualization scheme being designed to emphasize a subset of message properties, the message properties comprising properties relating to content of a message and properties related to transmission of the message;
displaying, on a touch screen of the user device, messages addressed to a user, that are received by the user device, based upon the selected visualization scheme, the selected visualization scheme causing a first of the messages to be displayed with emphasis on a first property of the first of the messages and a second visualization scheme of the set of visualization schemes causing the first of the messages to be displayed with emphasis on a second property of the first of the messages, the first property of the first of the messages and the second property of the first of the messages being different, wherein in the first visualization scheme,
a first message comprises first text data and a first image, and the first message is displayed in a first region in either a first representation or a second representation, the first representation displaying the first text data and not the first image, the second representation displaying the first image and not the first text data;

detecting a gesture by a user on a touch screen of the user device; and mapping the gesture to an action that is to be performed by the user device, wherein the mapping is dependent upon the selected visualization scheme and wherein the action comprises an interaction with one of the messages, the gesture being a linger gesture and mapping in the first visualization scheme to switching between the first representation and the second representation.

18. One or more storage devices according to claim 17, further comprising device-executable instructions for performing steps comprising:

executing the action.

19. One or more storage devices according to claim 17, wherein each message has a plurality of properties, wherein each visualization scheme emphasizes a different subset of the properties.

20. One or more storage devices according to claim 19, further comprising device-executable instructions for performing steps comprising:

identifying properties for each of the received messages; and storing the properties for each of the received messages.

* * * * *